US007596766B1

(12) United States Patent     (10) Patent No.:    US 7,596,766 B1
Sharma et al.                              (45) Date of Patent:     Sep. 29, 2009

(54) PREVIEW WINDOW INCLUDING A STORAGE CONTEXT VIEW OF ONE OR MORE COMPUTER RESOURCES

(75) Inventors: Ravish Sharma, Delhi (IN); Hemant Jaggi, Delhi (IN)

(73) Assignee: Adobe Systems Inc., San Jose, CA (US)

( * ) Notice: Subject to any disclaimer, the term of this patent is extended or adjusted under 35 U.S.C. 154(b) by 0 days.

(21) Appl. No.: 11/715,173

(22) Filed: Mar. 6, 2007

(51) Int. Cl.
    *G06F 3/048* (2006.01)
    *G06F 3/00* (2006.01)

(52) U.S. Cl. .................... 715/854; 715/713; 715/711

(58) Field of Classification Search ............... 715/854, 715/711, 713
See application file for complete search history.

(56) References Cited

U.S. PATENT DOCUMENTS 7,100,123 B1 * 8/2006 Todd et al. ................ 715/862
2005/0114778 A1 * 5/2005 Branson et al. ............ 715/711

OTHER PUBLICATIONS

Microsoft Windows XP OS, Microsoft Copyright 2002, pp. 1-2.*
Windows Explorer, Microsoft Copyright (c) 1981-2001, pp. 1-15.*
Word, Microsoft Office Word Copyright 2003, By Microsoft Corp., pp. 1-12.*
Reviewguys, Mousetool(Tm) http://www.reviewguys.com/site/mouse-tool/ pp. 1-4.*

* cited by examiner

*Primary Examiner*—Steven P Sax
*Assistant Examiner*—Andrey Belousov
(74) *Attorney, Agent, or Firm*—Chapin IP Law, LLC

(57) ABSTRACT

A preview window generator can be configured to sense a presence of navigation input applied to a resource reference (e.g., an icon, file path, etc.) displayed in an application window. The resource reference displayed in the application window can represent a resource such as stored content (e.g., a file, folder, etc.). While sensing input such as presence of a pointer in a vicinity of the resource reference in the application window, the preview window generator displays a context view (e.g., a file system view) including a representation of the stored content. Accordingly, a user can view the stored content in a relevant context view such as a storage context indicating where the content is stored in a file system without having to launch a separate windows explorer application. The preview window can be configured to receive input, enabling a viewer to modify a particular context view.

24 Claims, 9 Drawing Sheets

PREVIEW WINDOW INCLUDING A STORAGE CONTEXT VIEW OF ONE OR MORE COMPUTER RESOURCES

BACKGROUND

Conventional computer systems allow a user, who remembers a general location where a file resides in a file system, to click and search through a hierarchy of folders to find a desired file. To verify that the desired file has been located, the user can either recognize the file name or can open the file in order to launch the file's native application in order to view the file's contents.

Conventional computer systems allow the user to create different file paths to access different stored resources such as files and folders. For example, instead of clicking through folders and sub-folders displayed in a window, a user can access (and enable others to access) a desired file by providing an appropriate text string identifying a complete file path to the file. In order to properly access a stored file, the entered file path must correctly identify the file amongst folders and directories in which the file resides. Additionally, the user must observe proper formatting rules when creating the file path. Otherwise, the file path cannot be used to access stored content.

The file path as discussed above can be created for inclusion in a document. For example, a user may be required to enter (e.g., type in by hand) the text of the complete file path defining a link to be embedded in the document. Typically, if the user cannot remember all the segments of the file path, then the user must leave the native application of the document in order to open and click through folders and files to become familiar with all the directories and folders that make up the file path. If the complete file path is displayed via the file management software of the conventional computer system, then the user can copy the complete file path, return to native application, and then paste the copied file path into the document.

SUMMARY

Conventional computer systems suffer from a variety of deficiencies. For example, a user can create a link or resource identifier by copying-and-pasting a complete file path to the resource (e.g., file, image, website, etc.) into a corresponding document as discussed above. In order to create the link, the user navigates through a hierarchical tree of folders and subfolders to actually find the sought after resource. If the user navigates through an incorrect folder, then the user must either start over in a new folder or somehow correct his navigation sequence by again traversing down a hierarchy of one or more folders. Once the desired file is located, the user can copy the complete file path to the file and then paste that file path into a document. Such a conventional approach is ineffective because it often requires a significant amount of time for the user to navigate through a hierarchical tree of folders in a file system window (e.g., a separate viewing application) than is used to view a corresponding document for which the link is being created.

Additionally, according to conventional methods, when a user encounters a file path (or link) embedded in a document, the user must explicitly open (e.g. Ctrl-click with a mouse device) the file via the embedded file path in order to view its contents in a native application. This can be problematic because more time can be consumed to launch and retrieve a document for viewing in a native application. While the native application is being launched, the user's ability to continue working in the document's application can be restricted as a result of pop-up dialogue boxes, windows, etc. used to view the file. If the file path is incorrect or broken, even more time may be wasted as the native application searches for the improperly identified file.

If the user wishes to embed a file path (e.g., a selectable link) in a document, conventional methods provide no indication (as the user creates the link) whether the file path currently entered by the user is correct either in terms of text or format. The user must complete the file path from memory and then explicitly click on the file path in order to attempt to open the file to learn whether the recently entered file path is even correct. If the user does not recall the correct file path that is to be embedded in the document, then the user is forced to explicitly perform a folder navigation sequence as discussed above to navigate throughout a hierarchical tree and create an appropriate link. Again, all such navigation by user occurs outside the application in which the user is actually working.

Embodiments disclosed herein significantly overcome such deficiencies (e.g., those discussed above as well as those of the prior art) and provide mechanisms and techniques including a preview manager (e.g., a preview window generator).

According to one embodiment, a preview manager initiates display of a preview window when the user provides input (e.g., navigation input) with respect to a resource reference (e.g., a displayed file path, icon, etc.) representing stored content such as a file, folder, etc. For example, in one embodiment, as a user enters text to create a file path for inclusion in a document, a preview manager simultaneously displays a preview window (e.g., a transparent window overlaid on an application window) to display a context view. In one embodiment, the context view displayed in the preview window includes a pictorial view of resources specified in the file path.

If the user has only entered the first folder segment of the file path, the preview window displays the folder as identified by the first folder segment (e.g., a first resource) in the preview window. As the user continues to enter a second folder segment (e.g., a second resource) for the file path, the preview manager modifies the preview window to include a context view with respect to the second folder segment. Accordingly, as the user types in a respective filepath, the preview window provides a helpful "drill down" view of a resources associated with the filepath. This technique eliminates the need for a user to memorize and type in a complete filepath since the user can refer to the context view in the preview window to identify correct folders, subfolders, and/or file names to include in the path.

As the user creates the file path, the preview window can be displayed as a transparent window on a display screen. In further embodiments, if the user chooses to interact in the preview window instead of continuing to manually type the next segment of the file path, the preview window can transition from a transparent appearance to an opaque appearance as activity (e.g. mouse pointer activity) is detected within the preview window. In addition, as the mouse pointer is detected as being placed near a sub-folder icon in the preview window, a file path segment representing that sub-folder can be received as the next segment of the file path that the user began entering. Accordingly, a user can provide input with respect to the preview window for purposes of creating the file path.

In yet another example, if the user encounters a link (e.g. a hyperlinked file path) to a file already embedded in a document, the user can place a pointer (e.g. mouse pointer) over the link. Without explicitly clicking the link, the pointer's location can be sensed and a transparent preview window will display a pictorial view of the content as specified by or represented by the link as though the content specified by the link were being viewed in a native application normally used to view the content. If the link is a file path that leads to a single file, then the single file will be displayed in the preview window. If the link is a file path that references a folder, then the preview window can include a viewing of the folder and its sub-folders, directories, files, etc. for viewing by a respective user.

Thus, the preview manager (e.g. a preview window generator) senses a presence of navigation input applied to a resource reference displayed in an application window, where the resource reference represents stored content. The preview manager creates a context view including at least a partial view of a storage hierarchy including a representation of the stored content. While sensing the presence of the navigation input, the preview manager displays the context view in a preview window. The preview manager enables receipt of input commands in the preview window to navigate amongst the storage hierarchy and to update the context view of the preview window.

Accordingly, a preview window generator as described herein produces a preview window to display contents of files and folders when the user interacts with references to the files and folders. The preview window generator mitigates user effort by minimizing the explicit user actions needed to open and navigate through files and folders in a separate application. Mere placement of a pointer in a vicinity of a file path or providing input wry the file path can prompt the preview window generator to display the preview window on the display screen. Thus, there is no need to click on a folder (e.g. computer resource) since the preview window generator can display a preview window including a corresponding context view when the user hovers the mouse pointer over the folder. Also, according to one embodiment, the preview window generator can provide iconic (e.g. pictorial) hints to the user as the user types in a file path by sensing segments of the file path. Such a preview window can allow the user to dynamically verify a correct file path as the file path is typed.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif., U.S.A., herein after referred to as "Adobe" and "Adobe Systems."

BRIEF DESCRIPTION OF THE DRAWINGS

The foregoing and other objects, features and advantages of the invention will be apparent from the following more particular description of embodiments of the methods and apparatus for displaying a preview window while sensing navigation input, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

According to embodiments herein, a preview window generator is configured to sense a presence of navigation input applied to a resource reference (e.g., an icon, file path, etc.) displayed in an application window. The resource reference displayed in the application window can be a link, icon, file path, etc. representing a resource such as stored content (e.g., a file, folder, etc.). While sensing input such as presence of a pointer in a vicinity of the resource reference in the application window, the preview window generator displays a storage context view (e.g., a file system view) including a representation of the stored content with respect to other resources stored in a file system. Accordingly, a user can view the stored content in a relevant context view such as a storage context without having to launch a separate window explorer application to view the referenced resource. In other words, the preview window generator according to embodiments herein can mitigate user effort by minimizing the explicit user actions needed to open and navigate through files and folders to view a resource as referenced in a document. In one embodiment, the preview window can be configured to receive input, enabling a viewer to traverse a hierarchy of resources displayed in the preview window. Thus, a respective user can modify what information appears in the preview window.

In other embodiments, the preview window generator can be used to provide iconic (e.g. pictorial) hints to the user as the user types in a file path by sensing segments of the file path. For example, the preview window can be used to aid in creation of a file path by providing a storage context view of resources specified by the file path as the file path is being created. Additionally, the preview window can be used to dynamically verify correctness of a file path as the file path is being created. These and other embodiments will be discussed in more detail below.

Figure 1:
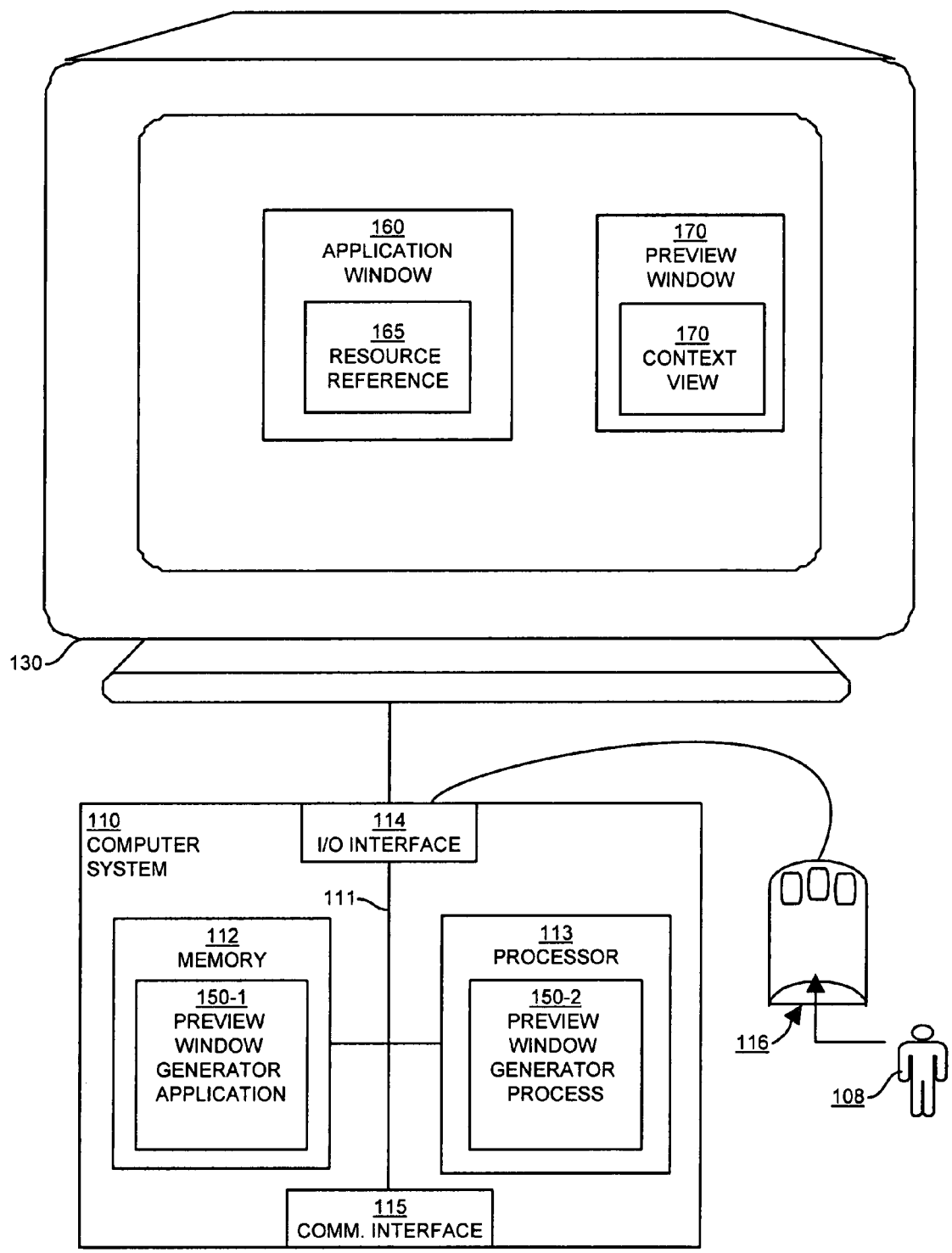
FIG. 1 is a block diagram of a computer system configured with a preview window generator according to embodiments herein.

Turning now to FIG. 1, a block diagram illustrates an example of architecture for a computer system 110 that executes, runs, interprets, operates or otherwise performs a preview window generator application 150-1 and/or preview window generator process 150-2 (e.g. an executing version of the application 150-1 controlled by user 108) according to embodiments herein. The computer system 110 may be any type of computerized device such as a personal computer, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a monitor display 130. An input device 116 (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a preview window generator application 150-1 that supports generation, display, and implementation of functional operations as will be further explained herein.

During operation of the computer system 110, the processor 113 accesses the memory system 112 via the interconnect 111 in order to launch, run, execute, interpret or otherwise perform the logic instructions of the preview window generator application 150-1. Execution of the preview window generator application 150-1 in this manner produces preview window generator process 150-2. In other words, the preview window generator process 150-2 represents one or more portions or runtime instances of the preview window generator application 150-1 (or the entire application 150-1) performing or executing within or upon the processor 113 in the computerized device 110 at runtime.

In one embodiment, the preview window generator 150 (e.g., preview window generator application 150-1 and/or preview window generator process 150-2) senses a presence of navigation input applied to a resource reference 165 displayed in application window 160. The resource reference 165 can represent stored content, such as a file or a folder. In response to detecting presence of navigation input with respect to the resource reference 165, preview window generator 150 initiates display of preview window 170 and corresponding context view 175. Accordingly, a respective user can view the resource reference 165 in different viewing contexts as presented by context view 175.

Figure 2:
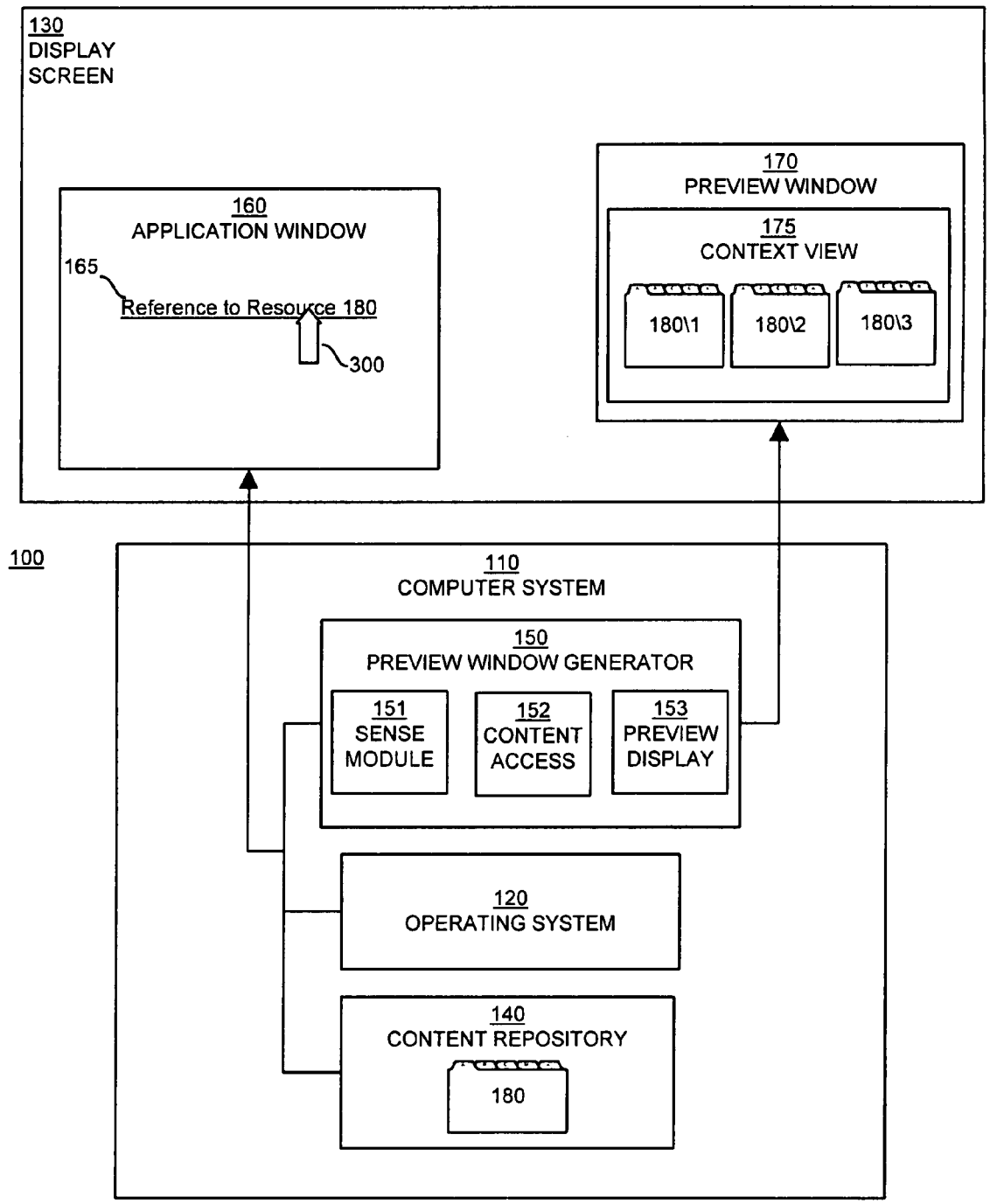
FIG. 2 is a block diagram of a computer system configured with a preview window generator for sensing navigation input and generation of a preview window according to embodiments herein.

FIG. 2 is a block diagram of a communication environment 100 configured with the preview window generator 150 according to embodiments herein. Computer environment 100 includes computer system 110 and display screen 130. The computer system 110 includes preview window generator 150, an operating system 120, and a content repository 140. The preview window generator 150 includes sense module 151, content access module 152, and preview display module 153. The content repository stores content 180.

Display screen 130 displays an application window 160 and a preview window 170. A content viewing application such as a content editor (e.g., word processor, etc.) running on operating system 120 initiates display of application window 160. Preview window generator 150 utilizes sense module 151 to monitor input with respect to the resource reference 165 in application window 160 for purposes of generating preview window 170. Based on input, the content access module 152 accesses respective repository 140 to identify storage context associated with resource reference 165. Preview display module 153 creates preview window 170 and context view 175 for displaying in preview window 170. The application window 160 includes resource reference 165 (e.g., an icon representing stored content, a link or file path to stored content, etc.). Pointer 300 controlled by user 108 enables navigation input in the application window 160 with respect to the resource reference 165. The preview window 170 includes a context view 175. The context view 175 is created by the preview window generator 150 and includes a representation of content as reference by resource reference 165. Here, the representation of stored content in the context view 175 consists of three folder icons (180\1, 180\2, 180\3) that represent content stored within folder 180 in the content repository 140.

Figure 3:
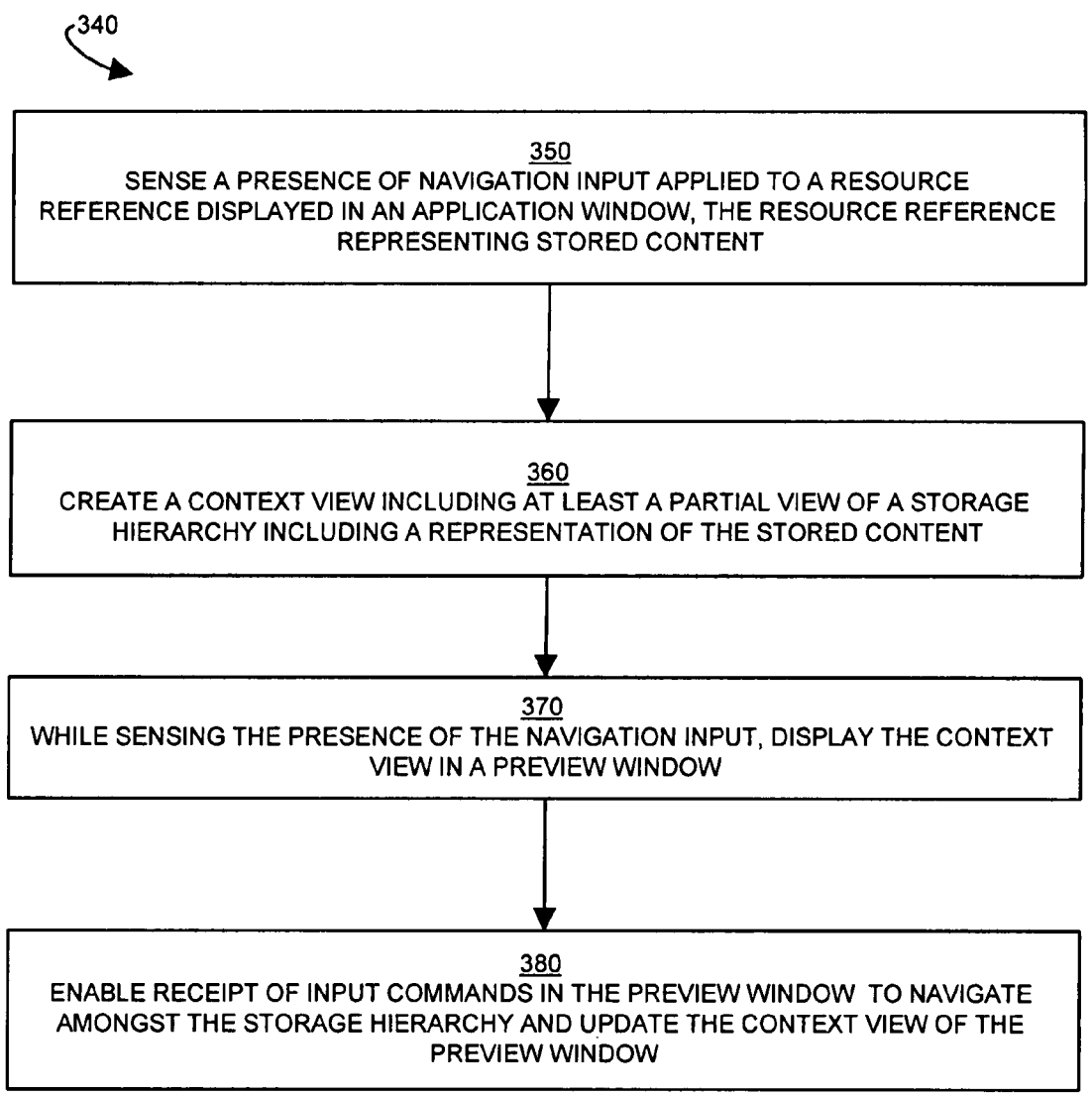
FIG. 3 is a flowchart of processing steps performed by the preview window generator according to embodiments herein.

FIG. 3 is a flowchart 340 of processing steps performed by the preview window generator 150 according to embodiments herein. The steps in flowchart 340 refer to the features illustrated in the block diagram of FIG. 2.

In flowchart 340, at step 350, the preview window generator 150 senses a presence of navigation input applied to a resource reference 165 (e.g., link) displayed in an application window 160. As previously discussed, the resource reference 165 represents stored content. In particular, the preview window generator 150 senses navigation input that is pointer 300 (e.g. mouse pointer) activity with respect to resource reference 165 (e.g., a link or file path) displayed in the application window 160. As the pointer 300 is placed over the resource reference 165 or, in other words, "hovers" over the resource reference 165, the preview window generator 150 senses such pointer activity. As this navigation input (e.g. pointer activity) is sensed, without requiring the user 108 to explicitly click or select the link, the preview window generator 150 accesses the stored content that is referenced by the link to folder 180.

At step 360, the preview window generator 150 creates a context view that includes at least a partial view of a storage hierarchy which includes a representation of the stored content. The preview window generator 150 creates a context view including a representation of the stored content as it would appear in a native application or a view of the stored content in relation to other resources in a respective hierarchical tree (e.g., file system) used to store the content. Preview window generator 150 creates a visual representation of the content within folder 180. Thus, based on selection of the resource reference 165, the preview window generator 150 creates icon representations for three subfolders (folder 180\1, folder 180\2, folder 180\3) for viewing in context view 175 of preview window 170.

At step 370, the preview window generator 150, while sensing the presence of the navigation input such as pointer 300 in a vicinity of resource reference 165, displays the context view 175 in a preview window 170. As the pointer is placed over the resource reference 165 (e.g. a link or file path), in accordance with input provided by preview window generator 150, the preview window 170 automatically displays the context view 175 with three icons for the subfolders (e.g., folder 180\1, folder 180\2, folder 180\3) of folder 180 as specified by resource reference 165. Therefore, the preview window 170 provides pictorial hints to the user 108 as to the stored content within folder 180. Note that preview window generator 150 can terminate display of the preview window 170 in response to detecting that the user 108 moves pointer 300 to another location on display screen 130 away from resource reference 165.

At step 380, the preview window generator 150 enables receipt of input commands in the preview window 170 to navigate amongst the storage hierarchy and update the context view of the preview window. Preview window generator 150 enables the preview window 170 to receive input from user 108. For example, assume that the user places pointer 300 in a vicinity of resource reference 165 to open preview window 170 and view the resource in a storage context view. After opening of preview window 170, embodiments herein enable the respective user 108 to move pointer 300 in a vicinity of preview window 170 and traverse the context view 175. Accordingly, in addition to displaying preview window 170 and creating the context view 175, the preview window generator 150 allows the preview window 170 to receive input from user 108.

Figure 4:
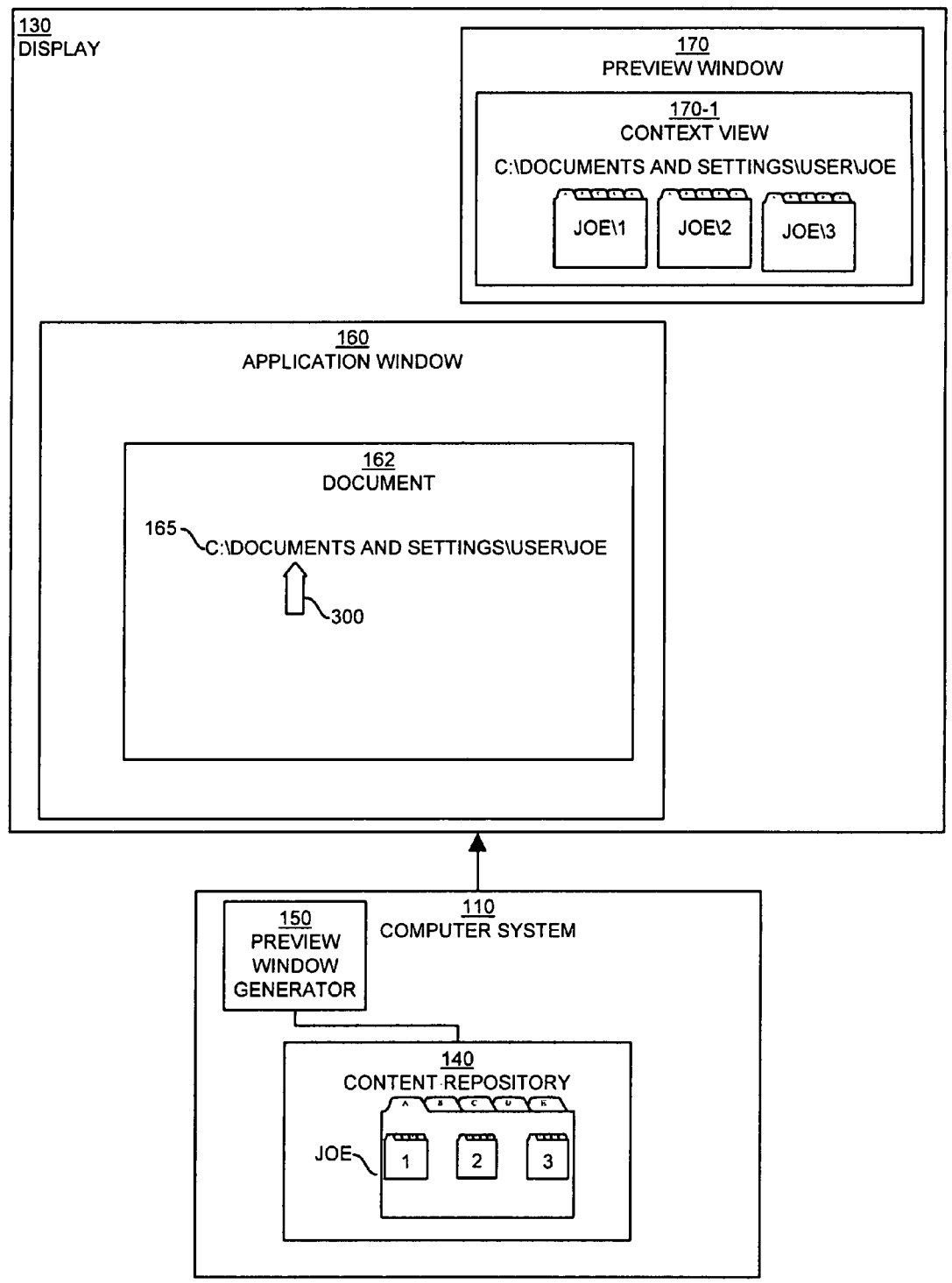
FIG. 4 is a block diagram illustrating a preview window generator and detection of a pointer placed over a resource reference according to embodiments herein.

FIG. 4 is a block diagram of the preview window generator 150 for detecting a pointer 300 placed over a resource reference 165 in accordance in accordance with another embodiment of the invention. FIG. 4 illustrates a computer system 110 with a display screen 130. The computer system 110 includes a preview window generator 150 and a content repository 140. The content repository 140 maintains stored content—folder 'JOE.' Folder 'JOE' in the content repository 140 further maintains stored content in 3 subfolders: folder 1 (e.g., folder JOE\1), folder 2 (e.g., folder JOE\2), folder 3 (e.g., folder JOE\3). Note that each sub-folder can alternatively be a file in folder 'Joe.'

In general, the display screen 130 displays an application window 160 and a preview window 170, which is created by the preview window generator 150. The application window 160 can be a document editor application for opening and viewing document 162. Document 162 can include a resource reference 165 (e.g., a file path such as C:\Documents and Settings\user\JOE) and a pointer 300 that provides navigation input in the application window 160. In response to moving pointer 300 in a vicinity of resource reference 165, the preview window generator 150 initiates display of preview window 170 including context view 175. The context view 175 is created by the preview window generator 150 and includes a representation of content (e.g. folder 'JOE') as specified by the resource reference 165. In the context of the present example, the resource reference 165 specifies a folder C:\Documents and Settings\user\JOE including three subfolders. Thus, the representation of stored content in the context view 175 includes the folder (e.g., 'JOE') as specified by resource reference 165, which includes three subfolders (JOE\1, JOE\2, JOE\3).

Figure 5:
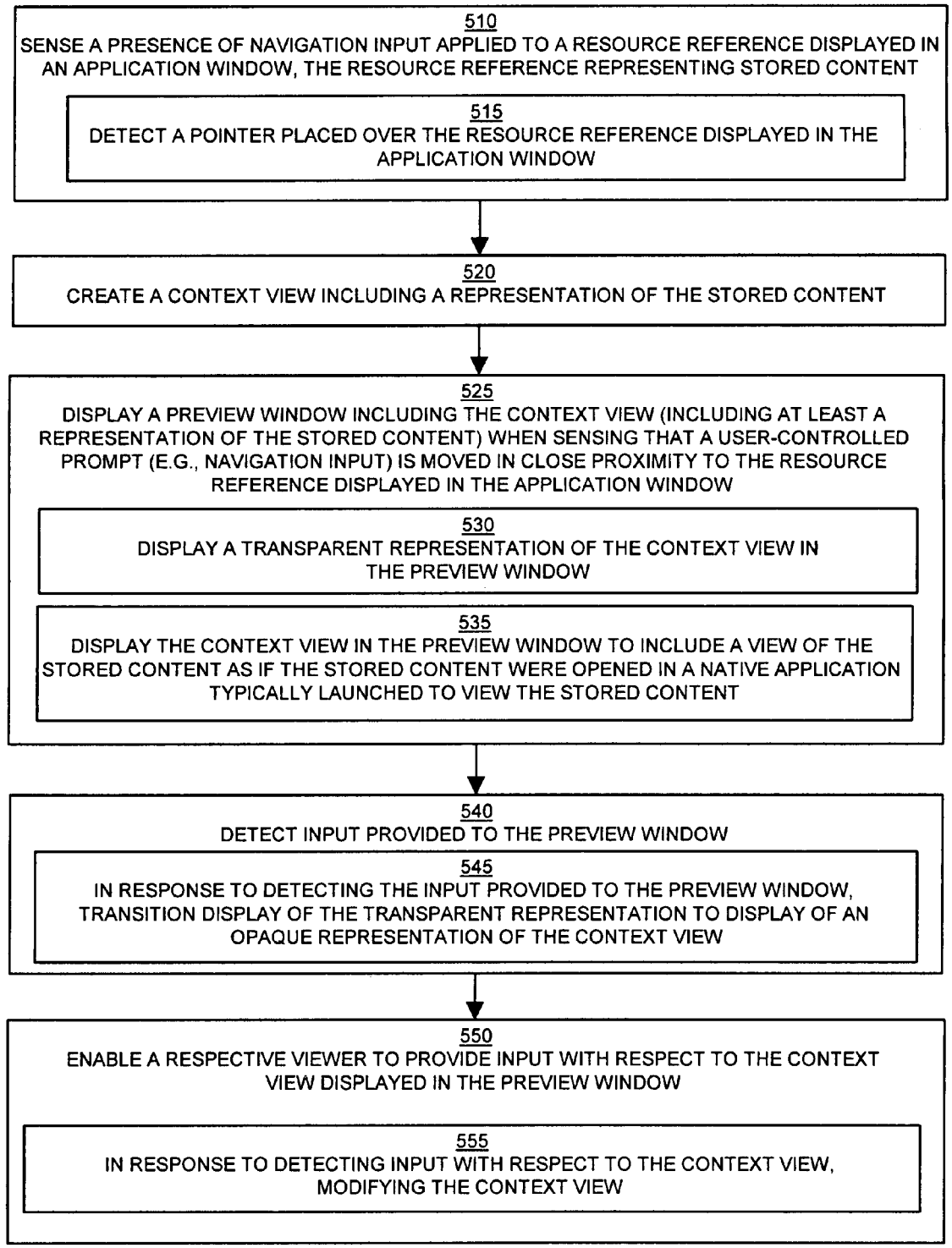
FIG. 5 is a flowchart of processing steps performed by the preview window generator according to embodiments herein.

FIG. 5 is a flowchart 500 of processing steps (510-555) performed by the preview window generator 150 according to the example block diagram in FIG. 4. Thus, the following discussion of flowchart 500 in FIG. 5 refers to features shown in FIG. 4.

In flowchart 500, at step 510, the preview window generator 150 senses a presence of navigation input (e.g., pointer 300) applied to (e.g., moved into a vicinity of) resource reference 165 displayed in an application window 160. The resource reference 165 (e.g., C:\Documents and Settings\user\JOE) represents stored content such as a folder of information associated with the user JOE.

At sub-step 515 of step 510, the preview window generator 150 detects a pointer 300 placed over the resource reference 165 displayed in the application window. Accordingly, one type of navigation input according to embodiments herein includes movement of a respective pointer about display screen 130 and, more particularly, movement of pointer 300 with respect to resource reference 165.

At step 520, in response to detecting the navigation input, the preview window generator 150 creates a context view 175 including a representation of the stored content as specified by resource reference 165. For example, in the context of the present example, the preview window generator 150 creates a representation of the content stored within folder 'JOE.' Thus, context view 175 includes icon representations for three subfolders (folder JOE\1, folder JOE\2, folder JOE\3) of folder JOE are created. The three subfolder icons thereby provide context and pictorial hints as to what is stored within folder JOE. Accordingly, the context view 175 includes a view a specific resource (e.g., the folder JOE) as specified by the resource reference 165 as well as other related resources (e.g., sub-folders JOE1, JOE2, and JOE3) in a storage hierarchy.

At step 525, the preview window generator 150 displays a preview window 170 including the context view 175 created in step 520. The preview window generator 150 initiates display of the preview window 150 and corresponding context view 175 (including at least a representation of the stored content) when sensing that a user-controlled prompt (e.g., navigation input from pointer activity) is moved in close proximity to the resource reference 165 (e.g. link) displayed in the application window 160.

At sub-step 530, the preview window generator 150 displays a transparent representation of the context view 175 in the preview window 170. The transparent representation can be a default viewing mode for the preview window 170. Display of a transparent preview window 170 and corresponding context view 175 provides a contrast in overall appearance in comparison to other items displayed in application window 160. The contrast (e.g., providing a transparent view of preview window 170 on display screen 130) reduces possible distraction that occurs as a result of automatically displaying the preview window 170 alongside of or within the application window 160.

At step 535, the preview window generator 150 displays the context view 175 in the preview window 170 to include a view of the stored content (as specified by the resource reference 165) as if the stored content were opened in a native application typically launched to view the stored content. Thus, as shown in FIG. 4, the context view 175 with the icon representations for the three subfolders (folder JOE\1, folder JOE\2, folder JOE\3) are included in the context view 175 inside the preview window 170 in a similar manner as if the folders were being viewed in a windows explorer application. However, if the resource reference 165 link in the application window 160 represents stored content within folder JOE such a file in a picture format (e.g. .mpeg, .gif, then the preview window generator 150 will create a context view 170 that includes a full representation of the picture instead of a view of a specified resource in a storage context view as provided by a windows explorer application.

At step 540, the preview window generator 150 detects input provided to the preview window 170. For example, as the user 108 directs the pointer 300 to be placed within the preview window in order to manipulate or select the icons in the context view, the preview window generator 150 detect such pointer activity occurring in the preview window 170.

In response to detecting the input provided to the preview window 170, at sub-step 545, the preview window generator 150 transitions display of the transparent representation to display of an opaque representation of the context view. For example, assume that the user 108 initially moves the pointer 300 in a vicinity of resource reference 165. Thereafter, assume that the user 108 moves the pointer into preview window 170. As the preview window generator 150 detects pointer activity such as movement of the pointer 300 the preview window 170 towards or placement of the pointer 300 is within the boundaries of the preview window 170, the preview window generator 150 changes the preview window 170 and corresponding context view 175 from transparent (e.g., 80% opaque) to completely opaque. The opaque representation assists the user 108 to clearly see the pictorial hints (e.g. icons) in the context view 175 as the user interacts with the preview window 170.

At step 550, the preview window generator 150 enables a respective viewer to provide input with respect to the context view 175 displayed in the preview window 170. For example, the user 108 (e.g. viewer) can place pointer 300 over a subfolder icon displayed in the context view 175. In response to detecting input with respect to the context view 175, at step 555, the preview window generator 150 modifies the context view 175. For example, the preview window generator 150 can detect when a user clicks on a sub-folder displayed in context view 175. In response to detecting such an input, the preview window generator 150 can modify context view 175 to include a further view of sub-folders or files stored in the selected sub-folder. Accordingly, a user 108 can traverse (e.g., drill-down or navigate upwards in) a hierarchical tree (or portion thereof) for display of different resources in context view 175.

In one embodiment, the preview window generator 150 can be configured to detect when the pointer 300 (e.g., user-controlled prompt) is no longer in close proximity to the resource reference 165 displayed in the application window 160 or in close proximity to the preview window 170. In response to detecting that the pointer 300 (e.g., user-controlled prompt) is no longer in close proximity to the resource reference 165, the preview window generator 150 terminates display of the preview window 170 including the context view 175. Thus, if the user 108 changes a position of the pointer 300 from being placed over the resource reference 165 (e.g. link) to being moved away from the resource reference 165, the preview window generator 150 terminates display of the preview window 170.

Figure 6:
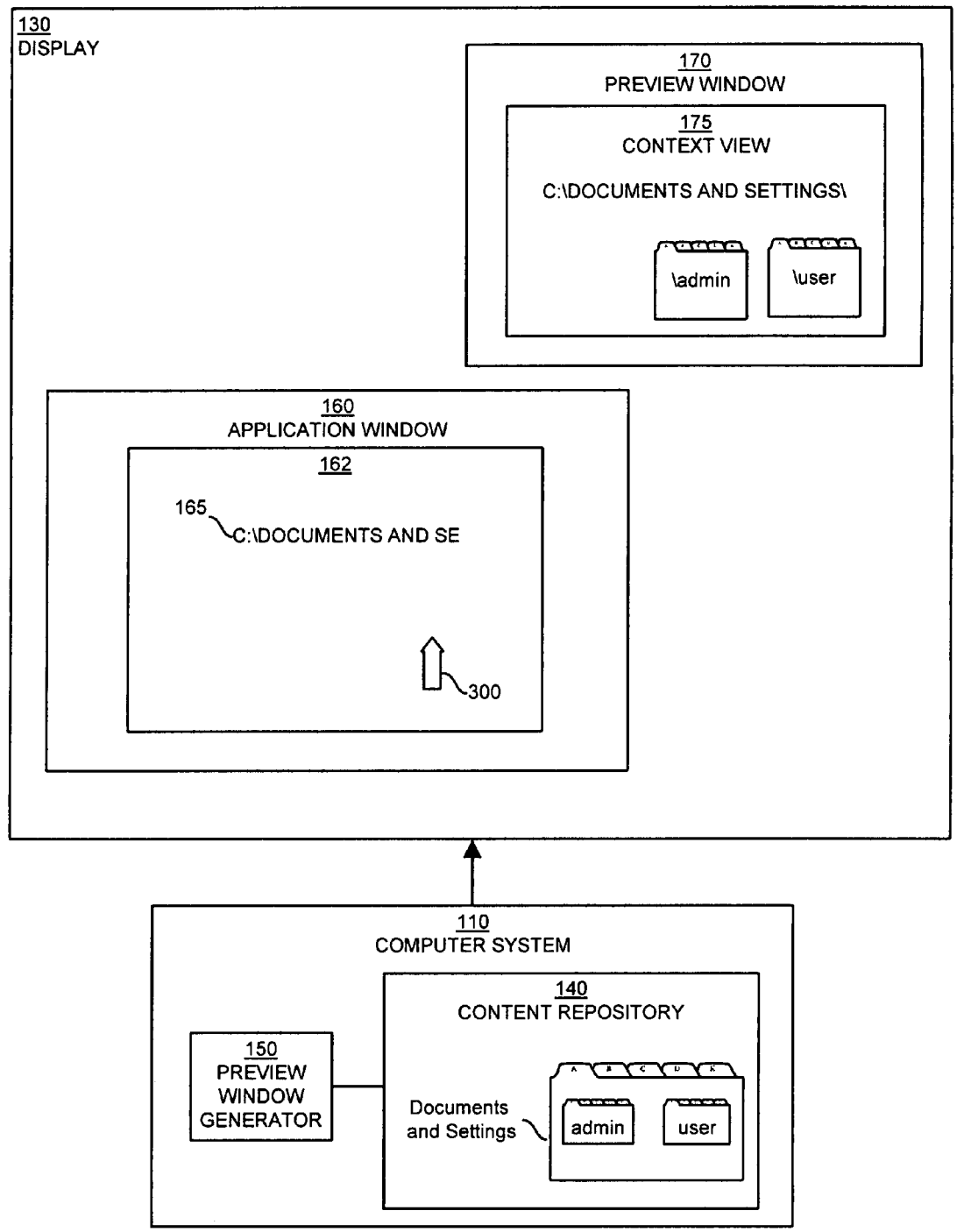
FIG. 6 is a block diagram illustrating a preview window generator configured to monitor creation of a resource reference according to embodiments herein.

FIG. 6 is a block diagram of the preview window generator 150 sensing a resource reference 165 representing a file path being created by a user in accordance with embodiments herein. The computer system 110 includes a preview window generator 150 and a content repository 140 of stored information. The content repository 140 maintains stored content—folder 'Documents and Settings.' Folder 'Documents and Settings' in the C disk has two associated sub-folders: folder 'admin,' and folder 'user.'

In the context of the present example, display screen 130 displays application window 160 (e.g., a content editor application) and a preview window 170, which is created by the preview window generator 150. The application window 160 can be generated by a document editor application that initiates display of document 162. The document 162 includes a resource reference 165 (e.g., link of file path) which is in the process of being created by a respective user 108. Creation of and embedding of the file path in the document 162 enables selective retrieval of a respective resource as specified by the file path at a later time.

The preview window 170 includes a context view 175 associated with resource reference 165 (e.g., file path currently being created). Preview window generator 150 produces context view 175 as a respective user types in segments of a respective file path to show the user 108 one or more corresponding resources referenced by the newly created file path. The context view 170-1 is created by the preview window generator 150 and includes a representation of content stored at the resource (e.g. folder 'Documents and Settings') that is referenced by the resource reference 165. Here, the representation of stored content in the context view 170-1 consists of two subfolder folders (folder Documents and Settings\admin, folder Documents and Settings\user) that are stored within folder 'Documents and Settings.'

Figure 7:
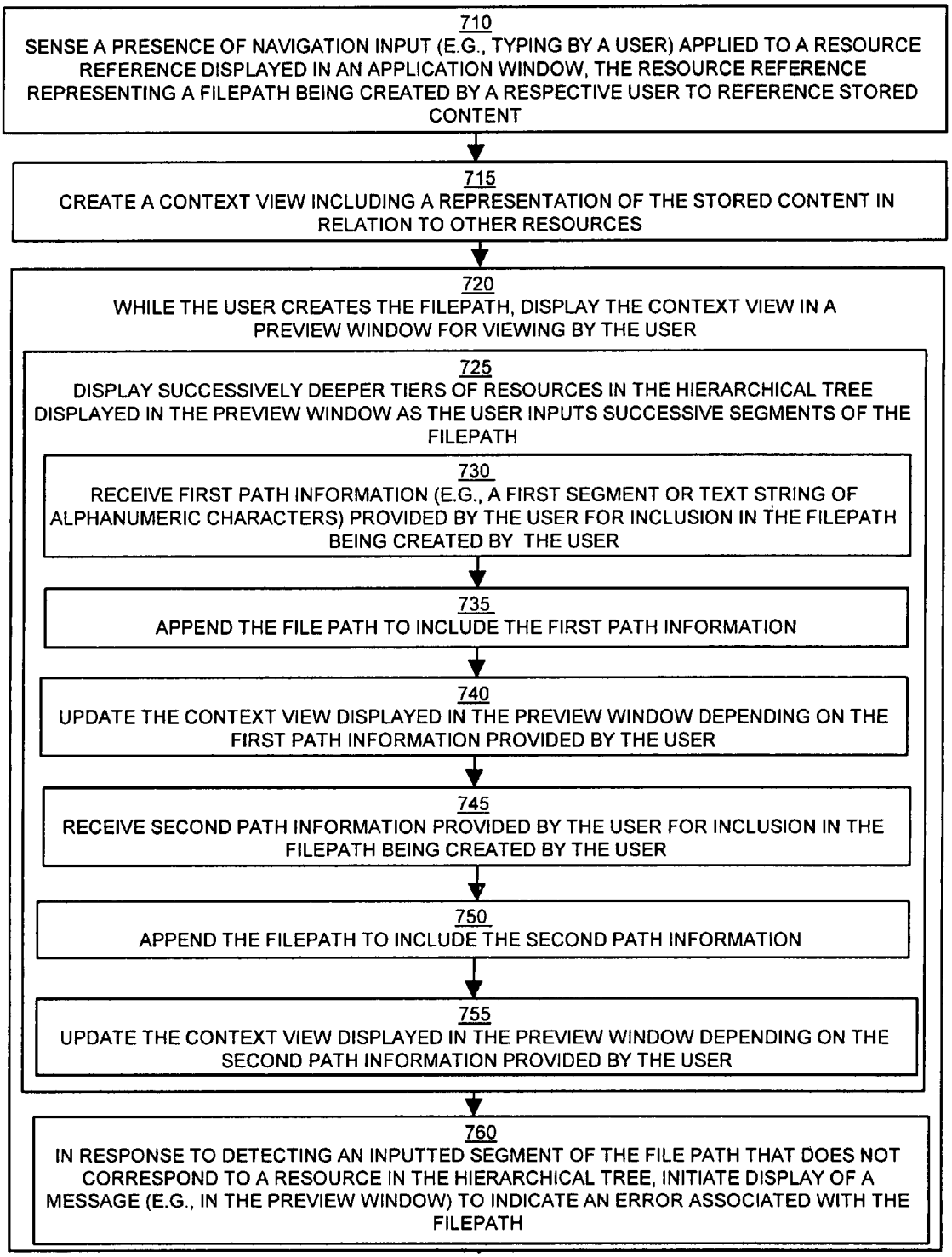
FIG. 7 is a flowchart of processing steps performed by a preview window generator according to embodiments herein.

FIG. 7 is a flowchart 700 of processing steps performed by the preview window generator 150 according to the example block diagram shown in FIG. 6. Thus, the following discussion of flowchart 700 in FIG. 7 refers to the example as shown in FIG. 6. In general, flowchart 700 illustrates creation of a resource reference 165 (e.g., file path) according to embodiments herein.

In flowchart 700, at step 710, the preview window generator 150 senses a presence of navigation input (e.g., typing by a user) applied to a resource reference 165 being created for inclusion in document 162 displayed in application window 160. In the context of the present example, the resource reference 165 represents a file path being created by a respective user to stored content such as a file, folder, website, etc. The preview window generator 150 senses the text and format of the resource reference (e.g., a file path) as the user 108 enters text into the resource reference 165. Sensing of navigation input can occur as soon as the user 108 begins to enter text to create the resource reference 165 (e.g., file path).

At step 715, the preview window generator 150 creates a context view 175 including a representation of the stored content as specified by the resource reference 165 in relation to other stored content. For example, the resource as specified by the resource reference 165 can specify a resource stored in hierarchical tree of resources.

While the user creates the resource reference 165 (e.g., filepath), at step 720, the preview window generator 150 displays the context view 175 in a preview window 170 for viewing by the user 108. In the context of the present example as shown in FIG. 6, the user 108 types in 'C:Documents and Se' in the resource reference 165. As the user continues to type and before the user completes creation of the file path, the preview window generator 150 creates a representation of the content stored within folder 'Documents and Settings,' even though the full file path segment for 'Documents and Settings' is only partially entered and not fully completed by the user 108. The preview window 170 uses the currently typed information in the resource reference 165, even if incomplete, to illustrate a context view 175 including any resources that could possibly match the resource currently entered by the user 108.

In one embodiment, in addition to displaying a name of the folder that potentially matches the text segment 'C:Documents and Se' entered by user 108, the preview window generator 150 initiates display of two subfolders (folder 'admin,' folder 'user') of folder 'Documents and Settings' for displaying in the context view 175. The two subfolder icons thereby providing context and pictorial hints as to what is stored within folder 'Documents and Settings'. Accordingly, preview window generator 150 provides the user 108 a preview of the resources currently specified by the resource reference as well as other sub-resources that could be selected by the user 108 to complete creation of the resource reference 165 as it is being created.

At step 725, the preview window generator 150 displays successively deeper tiers of resources in the hierarchical tree displayed in the preview window as the user inputs successive segments of the resource reference 165 (e.g., file path). For example, as identified by the following steps, the preview window generator 150 monitors the resource reference 165 for successive segments of a file path and updates context view 170 accordingly.

For example, in sub-step 730, the preview window generator 150 receives first path information (e.g., a first segment or text string of alphanumeric characters) provided by the user 108 for inclusion in the resource reference 165 being created by the user 108. At sub-step 735, the preview window generator 150 appends the file path to include the first path information. Accordingly, the resource reference 165 is includes current text input by a respective user. At sub-step 740, the preview window generator 150 updates the context view displayed in the preview window depending on the first path information. For example, based on the pictorial hint provided by a subfolder icon labeled 'user' displayed in the context view 170, the user 108 continues entering a file path segment that represents the 'user' subfolder (e.g. C:\Documents and Settings\user\).

To better understand the following steps of 745-755, assume that folder 'JOE' is a subfolder within the 'user' folder and that an icon for folder 'JOE' is included in the context view 170 as the preview window generator 150 senses that the user 108 is entering a file path segment for 'user.'

At sub-step 745, the preview window generator 150 receives second path information (e.g., a second segment or text string of alphanumeric characters) provided by the user for inclusion in the resource reference 165 being created by the user. At sub-step 750, the preview window generator 150 appends the file path to include the second path information as the user 108 types in this information. At sub-step 755, the preview window generator 150 updates the context view displayed in the preview window depending on the second path information provided by the user. For instance, based on the pictorial hint provided by the icon for the 'JOE' subfolder in a newly updated context view 175 (not pictured in FIG. 6) to represent stored content within the 'user' folder, the user 108 continues entering the file path to include a file path segment that represents the 'JOE' subfolder (e.g. C:\Documents and Settings\user\JOE). The context view is further updated to include new icon representations for any subfolders and files stored within folder 'JOE.' The "new" icons provided in the context view 175 of the preview window 170 are continually updated as a user inputs file path information. As discussed above, the updated context view 175 provides a context and corresponding pictorial hints as to what is stored within folder 'JOE' as the user 108 enters the 'JOE' file path segment. Thus, display of preview window and context view 175 enables a user to more easily and more precisely create a file resource reference 165 for inclusion in document 162.

Note that the text inputted by a respective user 108 may not corresponding to a valid file path. For example, a user 108 may mistype and input 'C:\Documents and Setings.' In the context of the present example, because the word 'Settings' in the newly created file path is misspelled and the preview window generator 150 cannot locate such a stored resource, the preview window generator 150 initiates display of an error message in preview window 170 to notify a user 108 of the error in the file path.

Thus, as specified by sub-step 760, embodiments herein include initiating displays of a message (e.g., in the preview window 170) to indicate an error associated with creation of the resource reference 165 (e.g., file path) in response to detecting an inputted segment of the file path that does not correspond to a resource in a hierarchical tree or corresponding storage context view. Thus, if the user enters a file path segment that does not correctly identify a respective such as a file or folder (or if the segment is misspelled), the context view 175 in preview window 170 is updated to include an error message that informs that user that the file path that is currently being entered is erroneous. Accordingly, the user can correct the mistake before proceeding further.

Note that when the user 108 completes creation of the resource reference 165 in document 162, the user can move the prompt (e.g., pointer) to edit different portions of document 162. When doing so, because the resource reference 165 is no longer being edited, the preview window generator 150 discontinues displaying the preview window 170 including context view 175.

Figure 8:
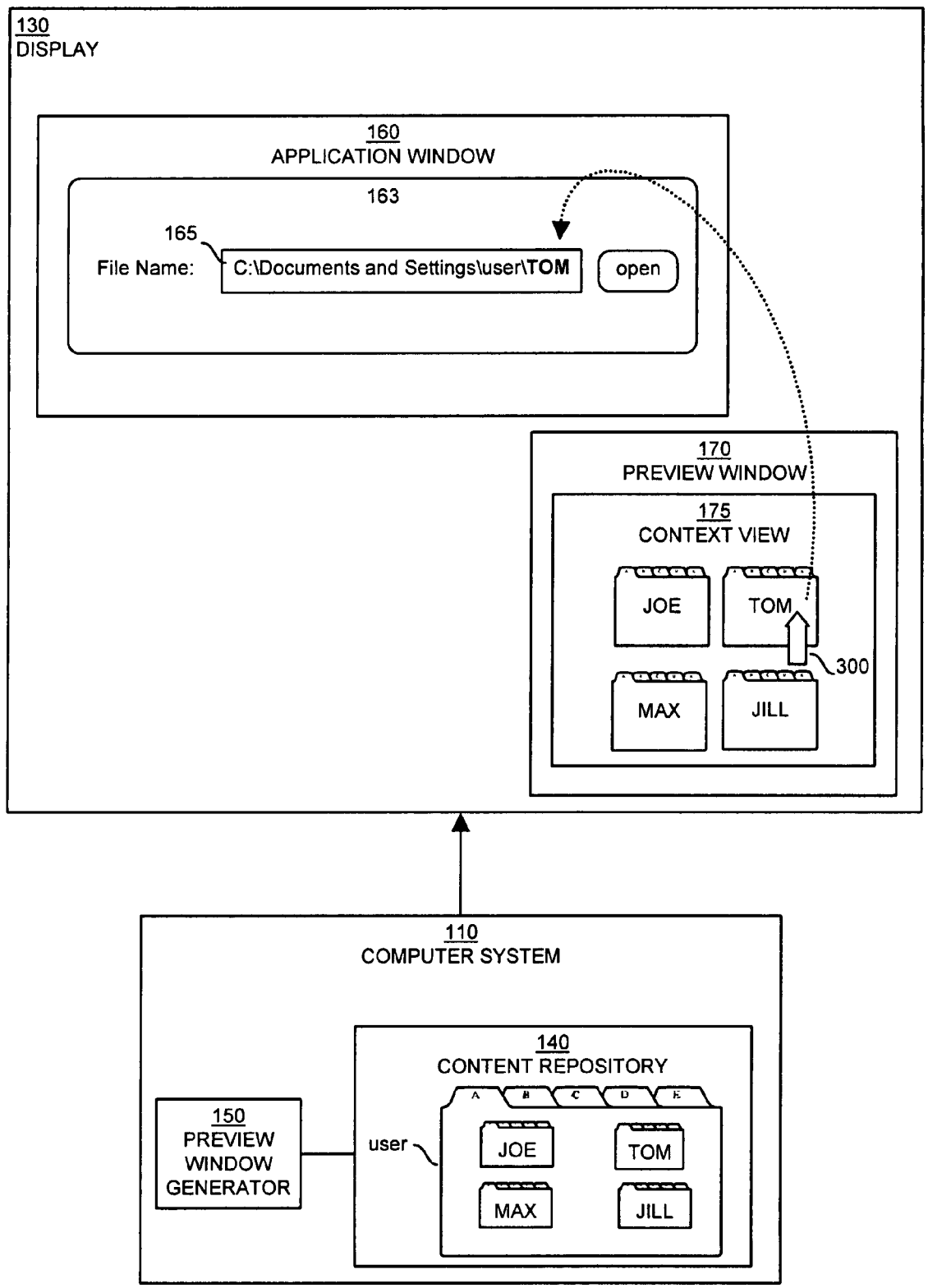
FIG. 8 is a block diagram illustrating a preview window generator configured according to embodiments herein.

FIG. 8 is a block diagram of the preview window generator 150 receiving a selection of a resource in the preview window 170 according to embodiments herein. As shown, computer system 110 includes a display screen 130. The computer system 110 includes a preview window generator 150 and a content repository 140. The content repository 140 maintains stored content—folder 'user.' Folder 'user in the content repository 140 further maintains stored content in 4 subfolders: folder 'JOE,' folder 'TOM,' folder 'MAX,' folder 'JILL.'

The display screen 130 displays an application window 160 and a preview window 170, which is created by the preview window generator 150. The application window 160 includes a dialog box 163. Application window 160 displays dialog box 163 in response to detecting a command by the user 108 to open a file (e.g., an editable document) for viewing on display screen 130.

In the context of the present example, the dialog box 163 provides a text box (e.g., data field for entering text) which allows a user 108 to enter a resource reference (e.g., file path). As a user 108 enters text to the resource reference 165, the preview window generator 150 updates the context view 175 as previously discussed. For example, the context view 175 is created by the preview window generator 150 and includes a representation of content stored at the resource (e.g. folder 'user') that is referenced by the resource reference 165. Here, the representation of stored content in the context view 175 consists of the four subfolders (folder 'JOE,' folder 'TOM,' folder 'MAX,' folder 'JILL') that are stored within folder 'user.'

Figure 9:
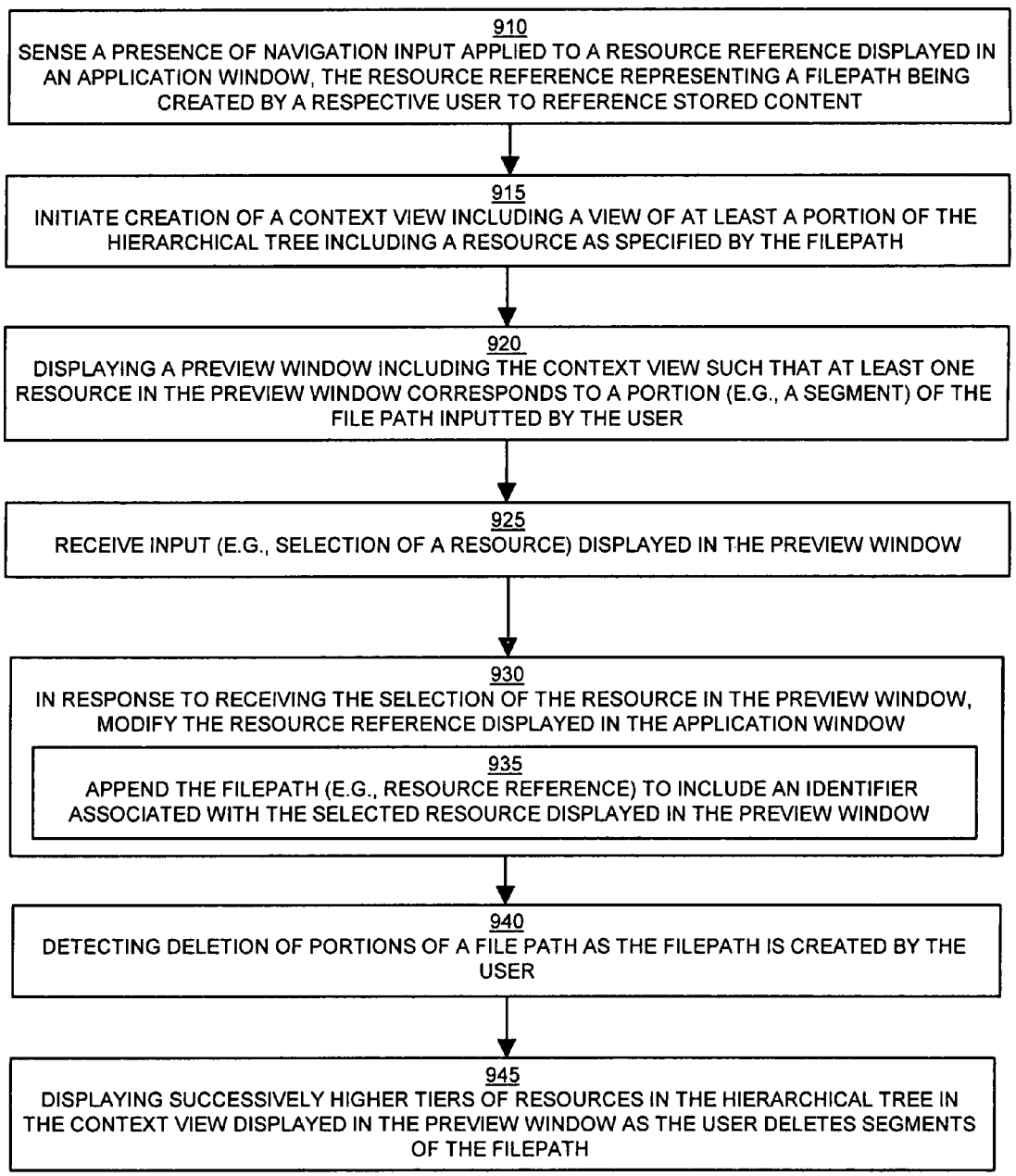
FIG. 9 is a flowchart of processing steps performed by a preview window generator according to embodiments herein.

FIG. 9 is a flowchart 900 of processing steps performed by the preview window generator 150 according to the example block diagram shown in FIG. 8. Thus, the following discussion of flowchart 900 in FIG. 9 refers to the example as shown in FIG. 8. In general, flowchart 900 illustrates creation of a resource reference 165 (e.g., file path) based on selection of resources displayed in context view 175 according to embodiments herein.

In flowchart 900, at step 910, the preview window generator 150 senses a presence of navigation input (e.g., typing by a user) applied to a resource reference 165 displayed in application window 160. The resource reference 165 represents a file path being created by a respective user to reference stored content. As discussed above, the resource reference 165 in dialog box 163 specifies a file to be opened for viewing in application window 160. As previously discussed, the dialog box 163 opened in an application window allows a user 108 to enter text for a file path (e.g. resource reference) in order to open files and folders.

For purposes of steps 915-920, it is helpful to assume that the user has entered the following filepath only: C:\Documents and Settings\user\. At step 915, the preview window generator 150 initiates creation of a context view 175 including a view of at least a portion of a hierarchical tree (e.g., a storage context) including a resource as specified by the filepath. The preview window generator 150 creates a representation of the content stored within folder 'user.' Hence, icon representations for the four subfolders (folder 'JOE,' folder 'TOM,' folder 'MAX,' folder 'JILL') of folder 'user are created and included in the context view 175. As discussed above, the four subfolder icons provide context and pictorial hints as to what is stored within folder 'user.'

At step 920, the preview window generator 150 displays a preview window 170 including the context view 175 such that at least one resource in the preview window 170 corresponds to a portion (e.g., a segment) of the file path inputted by the user 108. Accordingly, a user 108 can view resources currently specified by the resource reference 165 being created by the user 108.

At step 925, the preview window generator 150 receives input (e.g., selection of a resource) displayed in the preview window 170. The selection corresponds to a sub-resource that the user 108 would like to append to the resource reference 165 being created in dialog box 163. As will be discussed below, selection of resources displayed in the preview window 170 enables a user to "drill down" a hierarchy and for selection of a target resource for display in application window 160. Each time a user selects a resource from the context view 175 and updates the resource reference 165, the preview window generator 150 updates the context view 175 for viewing a successively deeper tier of the resource hierarchy for viewing by the user 108.

At step 930, in response to receiving the selection of the resource in the preview window 170, the preview window generator 150 modifies the resource reference displayed in the application window. At sub-step 935, the preview window generator 150 appends the filepath (e.g., resource reference) to include an identifier associated with the selected resource displayed in the preview window.

The preview window generator 150 thus allows the user 108 to place a pointer over the 'TOM' subfolder icon as it is displayed in the preview window. In response to the pointer's placement over and clicking on the 'TOM' subfolder icon, the preview window generator 150 inserts a filepath segment that represents the 'TOM' subfolder in the application window. Thus, in FIG. 8, the filepath in the application window reads as "C:\Documents and Settings\user\TOM." The "TOM" filepath segment is not entered via a keyboard. Instead, the preview window generator 150 inserts the "TOM" filepath segment as the user 108 selects (e.g., double clicks on) the 'TOM' subfolder icon displayed in the preview window 170. As discussed above, the preview window generator 150 updates the context view 175 for viewing additional sub-resources in the 'TOM' subfolder.

In addition to creating a respective reference 165, the preview window generator 165 detects when a user traverses upwards in a hierarchical tree of resources. For example, at step 940, assume that the preview window generator 150 detects deletion of portions of a (e.g., resource reference 165) file path as the filepath is created by the user.

At step 945, the preview window generator 150 displays successively higher tiers of resources in the hierarchical tree in the context view 175 displayed in the preview window as the user deletes segments of the filepath. Accordingly, as the user deletes one or more filepath segments in the resource reference 165, the preview window generator 150 detects (e.g., senses) that the filepath in the application window is being modified and, thus, updates the context view 175 in the preview window 170 to properly represent stored content that is referenced by the resource reference 165 (e.g., portion of the file path) that remains.

For example, as the user deletes both the filepath segments for 'TOM' and 'user' the filepath is modified to read "C:\Documents and Seftings\." The preview window generator 150 senses the deletions and creates a representation of the content stored within folder 'Documents and Settings.' Hence, icon representations for two subfolders (folder 'admin,' folder 'user') of folder 'Documents and Settings' are created and included in the context view (as depicted in FIG. 6).

Accordingly, embodiments herein enable a preview window generator 150 to display the context view 175 in the preview window 170 in response to receiving input from a respective user 108 creating a resource reference such as a file path in a dialog window presented in the application window 160.

Note again that techniques herein are well suited to allow for displaying a preview window while sensing navigation input via a preview window generator 150. However, embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method of presenting in which a computer system performs operations comprising:

sensing a presence of navigation input applied to a resource reference displayed in a document of a text editor application window, the resource reference representing stored content;

creating a context view including at least a partial view of a storage hierarchy including a representation of the stored content;

while sensing the presence of the navigation input, displaying the context view in a preview window;

enabling receipt of input commands in the preview window to navigate amongst the storage hierarchy and update the context view of the preview window; and wherein displaying the context view in the preview window while sensing the presentation of the navigation input includes:

detecting presence of a user-controlled prompt in close proximity to the resource reference displayed in the document of the text editor application window;

in response to detecting presence of the user-controlled prompt in close proximity to the resource reference, initiating display of the preview window including the context view;

detecting that the user-controlled prompt is no longer in close proximity to the resource reference displayed in the document of the text editor application window;

in response to detecting that the user-controlled prompt is no longer in close proximity to the resource reference, terminating display of the preview window including the context view;

wherein the resource reference is a file path pointing to a location of the stored content in the storage hierarchy; and wherein sensing the presence of navigation input applied to the resource reference comprises receiving inputted portions of the file path as the file path is created by a user providing input with respect to the document, the method further comprises:

displaying successively deeper tiers of resources in a hierarchical tree in the preview window as the user input segment of the file path.

2. The method as in claim 1, wherein sensing the presence of navigation input applied to the resource reference comprises detecting a pointer placed over the resource reference displayed in the document of the text editor application window, the document being edited via input to the text editor application window.

3. The method as in claim 1, wherein sensing the presence of navigation input applied to the resource reference comprises receiving at least one segment of a file path in the document of the text editor application window.

4. The method as in claim 1, wherein displaying the context view in the preview window comprises displaying a transparent representation of the context view in the preview window.

5. The method as in claim 4, wherein displaying the transparent representation of the context view in the preview window comprises:

detecting input provided to the preview window; and in response to detecting the input provided to the preview window, transitioning display of the transparent representation to display of an opaque representation of the context view.

6. The method as in claim 1, wherein displaying the context view in the preview window comprises displaying at least a representation of the stored content in the context view.

7. The method as in claim 1, wherein creating the context view including a representation of the stored content comprises:

generating an error message for the preview window when the resource reference related to the sensed navigation input does not represent the stored content.

8. The method as in claim 1, further comprises:

detecting presence of a pointer placed over a representation of the stored content in the context view displayed in the preview window; and in response to receiving navigation input associated with the representation of the stored content in the preview window, modifying the resource reference in the document of the text editor application window.

9. The method as in claim 1, wherein sensing navigation input comprises sensing navigation input applied to at least one of a file and a folder reference displayed in the document of the text editor application window.

10. The method of claim 1, wherein sensing the presence of navigation input applied to the resource reference displayed in the document of the text editor application window comprises:

receiving alphanumeric input associated with the resource reference as provided by a user; and wherein creating the context view includes:

repeatedly updating the context view displayed in the preview window depending on the alphanumeric input provided by the user.

11. The method of claim 1, wherein displaying the context view in the preview window while sensing the presence of the navigation input comprises:

displaying the preview window including the context view when sensing that a user-controlled prompt is moved in close proximity to the resource reference displayed in the document of the text editor application window.

12. The method as in claim 1, further comprises:

receiving input with respect to the preview window; and in response to receiving the input with respect to the preview window, modifying the resource reference displayed in the document of the text editor application window.

13. The method as in claim 12, wherein receiving input commands with respect to the preview window comprises receiving selection of a particular resource from the storage hierarchy displayed in the preview window; and wherein modifying the resource reference includes appending an identifier associated with the resource displayed in the preview window to the resource reference displayed in the document in the text editor application window, the modified resource reference pointing to a location of the particular resource selected from the storage hierarchy.

14. The method as in claim 1, wherein sensing the presence of navigation input applied to the resource reference comprises receiving inputted portions of a file path as the file path is created by a user, the method further comprises:

displaying at least one resource in the preview window based on a portion of the file path inputted by the user;

receiving selection of a resource displayed in the preview window;

in response to receiving the selection, appending the file path to include an identifier associated with the resource.

15. The method as in claim 1 further comprises:

in response to detecting an inputted segment of the file path that does not correspond to a resource in the hierarchical tree displayed in the preview window, initiating display of a message in the preview window to indicate an error associated with the file path.

16. The method as in claim 1, wherein displaying the context view in the preview window occurs in response to receiving input from a respective user creating a file path in a dialog window presented in the text editor application window, the context view in the preview window including a display of folders and files corresponding to the file path created by the user.

17. The method as in claim 1, wherein displaying the context view in the preview window includes displaying the context view in the preview window comprising a view of the stored content as if the stored content were opened in a native application typically launched to view the stored content.

18. A computer system comprising:

a processor;

a memory unit that stores instructions associated with an application executed by the processor; and an interconnect coupling the processor and the memory unit, enabling the computer system to execute the application and perform operations of:

sensing a presence of navigation input applied to a resource reference displayed in a document of a text editor application window, the resource reference representing stored content;

creating a context view including at least a partial view of a storage hierarchy including a representation of the stored content;
while sensing the presence of the navigation input, displaying the context view in a preview window;
wherein displaying the context view in the preview window while sensing the presentation of the navigation input includes:
  detecting presence of a user-controlled prompt in close proximity to the resource reference displayed in the document of the text editor application window;
  in response to detecting presence of the user-controlled prompt in close proximity to the resource reference, initiating display of the preview window including the context view;
  detecting that the user-controlled prompt is no longer in close proximity to the resource reference displayed in the document of the text editor application window; and
  in response to detecting that the user-controlled prompt is no longer in close proximity to the resource reference, terminating display of the preview window including the context view;
enabling receipt of input commands in the preview window to navigate amongst the storage hierarchy and update the context view of the preview window;
wherein the resource reference is a file path pointing to a location of the stored content in the storage hierarchy; and
wherein sensing the presence of navigation input applied to the resource reference comprises receiving inputted portions of the file path as the file path is created by a user providing input with respect to the document, the method further comprises:
displaying successively deeper tiers of resources in a hierarchical tree in the preview window as the user inputs segments of the file path.

19. The method as in claim 1, wherein sensing the presence of navigation input includes detecting creation of the resource reference based on input from a user of the text editor application modifying the document, the document being opened and displayed to the user in the text editor application window.

20. The method as in claim 19 further comprising:
in response to detecting creation of the resource reference in the document based on input from the user entering text for appending to the resource reference in the document, displaying the preview window and the context view enabling navigation amongst the storage hierarchy.

21. The method as in claim 20 further comprising:
in response to receiving input from the user providing navigation commands with respect to the storage hierarchy displayed in the preview window, updating the storage hierarchy in the preview window to include resources at different tiers of the storage hierarchy.

22. The method as in claim 20, wherein displaying the context view in the preview window further comprises:
displaying the preview window independently of the text editor application window displaying the document; and
displaying the representation of the stored content in relation to other tiers of resources stored in a repository.

23. The method as in claim 1, wherein displaying the context view in the preview window includes displaying the representation of the stored content at a first tier of the storage hierarchy, the method further comprising:
displaying multiple sub-resources in the context view at a second tier of the storage hierarchy beneath the first tier, the sub-resources being related to the stored content; and
wherein enabling receipt of the input commands includes enabling a user of the text editor application window to navigate upward to a higher tier in the storage hierarchy above the first tier to view other resources in the storage hierarchy.

24. The method as in claim 19 further comprising:
in response to detecting completion of creating the resource reference based on input from the user editing a portion of the document other than the resource reference, terminating display of the preview window.

\* \* \* \* \*

UNITED STATES PATENT AND TRADEMARK OFFICE
CERTIFICATE OF CORRECTION

PATENT NO. : 7,596,766 B1  Page 1 of 1
APPLICATION NO. : 11/715173
DATED : September 29, 2009
INVENTOR(S) : Sharma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 12 days.

Signed and Sealed this

Twenty-eighth Day of September, 2010

David J. Kappos
*Director of the United States Patent and Trademark Office*